US009065875B2

(12) United States Patent
Holm

(10) Patent No.: US 9,065,875 B2
(45) Date of Patent: Jun. 23, 2015

(54) METHOD AND APPARATUS FOR ESTABLISHING A POC SESSION

(75) Inventor: Jan Holm, Gävle (SE)

(73) Assignee: TELEFONAKTIEBOLAGET L M ERICSSON (publ), Stockholm (SE)

( * ) Notice: Subject to any disclaimer, the term of this patent is extended or adjusted under 35 U.S.C. 154(b) by 295 days.

(21) Appl. No.: 13/119,552

(22) PCT Filed: Sep. 19, 2008

(86) PCT No.: PCT/EP2008/062577

§ 371 (c)(1), (2), (4) Date: Jun. 7, 2011

(87) PCT Pub. No.: WO2010/031449

PCT Pub. Date: Mar. 25, 2010

(65) Prior Publication Data

US 2011/0231558 A1 Sep. 22, 2011

(51) Int. Cl.
*H04L 29/06* (2006.01)

(52) U.S. Cl.
CPC .................................. *H04L 65/4061* (2013.01)

(58) Field of Classification Search
None
See application file for complete search history.

(56) References Cited

U.S. PATENT DOCUMENTS

2006/0034336 A1* 2/2006 Huh et al. .................... 370/498
2006/0089998 A1* 4/2006 Kim et al. .................... 709/229
2006/0153102 A1* 7/2006 Kuure et al. .................. 370/263
2006/0205430 A1* 9/2006 Park et al. .................... 455/518
2006/0223563 A1* 10/2006 Sung et al. .................... 455/518
2006/0234744 A1* 10/2006 Sung et al. .................... 455/518
2007/0076660 A1* 4/2007 Sung et al. .................... 370/329
2007/0280256 A1* 12/2007 Forslow ..................... 370/395.2
2008/0039029 A1* 2/2008 Dostal et al. ................. 455/90.2
2008/0076403 A1* 3/2008 Park et al. .................. 455/422.1
2010/0004014 A1* 1/2010 Coulombe .................... 455/519
2013/0083733 A1* 4/2013 Park et al. .................... 370/328

FOREIGN PATENT DOCUMENTS

GB 2 424 147 A 9/2006
WO 2006/096023 A1 9/2006
WO 2007/037644 A1 4/2007

OTHER PUBLICATIONS

PCT International Search Report, mailed Apr. 1, 2010, in connection with International Application No. PCT/EP2008/062577.

(Continued)

*Primary Examiner* — Ian N Moore
*Assistant Examiner* — Brian T Le
(74) *Attorney, Agent, or Firm* — Leffler Intellectual Property Law, PLLC

(57) ABSTRACT

A Push-to-talk over Cellular (PoC) communication session is established between an inviting PoC client and at least one invited PoC client using an IP Multimedia Subsystem network. Establishment involves using a pre-established session procedure to negotiate media parameters between the inviting PoC client and a participating PoC server for the inviting PoC client. At the inviting PoC client, a Talk Burst Control Protocol (TBCP) or Media Burst Control Protocol (MBCP) message is sent directly to its participating PoC server, the TBCP or MBCP message containing the PoC address of the at least one invited PoC client. At the participating PoC Server, in response to receipt of the TBCP or MBCP message, a SIP INVITE message is generated and sent towards a participating PoC server for the at least one invited PoC client.

5 Claims, 5 Drawing Sheets

(56) References Cited

OTHER PUBLICATIONS

PCT Written Opinion, mailed Apr. 1, 2010, in connection with International Application No. PCT/EP2008/062577.
International Preliminary Report on Patentability, mailed Dec. 23, 2010, in connection with International Application No. PCT/EP2008/062577.
Chinese Office Action, dated May 31, 2013, in connection with Chinese Patent Application No. 200880131256.9 (see translation below) (all pages)
Translation of Chinese Office Action, dated May 31, 2013, in connection with Chinese Patent Application No. 200880131256.9 (all pages).
Chinese Search Report, dated May 23, 2013, in connection with Chinese Patent Application No. 200880131256.9 (see translation below) (all pages).
Translation of Chinese Search Report, dated May 23, 2013, in connection with Chinese Patent Application No. 200880131256.9 (all pages).

* cited by examiner

METHOD AND APPARATUS FOR ESTABLISHING A POC SESSION

TECHNICAL FIELD

The present invention relates to a method and apparatus for establishing a Push-to-Talk over Cellular (PoC) session between users.

BACKGROUND

The Industry group known as the Open Mobile Alliance (OMA) has developed a Push to Talk over Cellular (PoC) specification aimed at enabling the provision of services over standard mobile wireless communication networks which resemble walkie-talkie services, i.e., at the push of a button, a subscriber can be connected almost instantly to one or more other subscribers. PoC is currently defined in the documents published by the Open Mobile Alliance, including PoC specifications 1.0 and 2.0.

PoC is based on the Session Initiation Protocol (SIP) specified in RFC3261 and the extensions developed by Internet Engineering Task Force (IETF). PoC systems are typically implemented on GSM/GPRS/3G networks and make use of the IP Multimedia Subsystem (IMS) standardised by the 3rd Generation Partnership Project to facilitate the introduction of advanced data services and, in particular, of real-time multimedia services into cellular networks. PoC Servers are located within the IMS or are attached thereto, and implement the functionality for setting up and controlling PoC sessions. PoC data comprises "bursts" carried over a packet network using Real-time Transport Protocol (as defined in RFC 2326).

The PoC infrastructure includes PoC Clients and PoC Servers. The PoC Client resides in a mobile terminal and is used to access the PoC service. A PoC Server acts either as the Controlling PoC Function (typically where the PoC Server is within the IMS network of the initiating party) or a Participating PoC Function (typically where the PoC Server is within the IMS network of a called party) or both. The determination of the PoC Server role takes place during PoC session establishment and is dependent upon the type of PoC session. Once the PoC Server roles have been determined they remain fixed for the duration of the session.

The PoC Server providing the Controlling PoC Function provides centralised PoC session handling which includes floor-control, Media distribution, policy enforcement for participation in PoC group sessions, and the PoC session participant information. Floor control involves granting the floor to one PoC client for a defined time period or until that client releases the floor, and thereafter allowing another client to take the floor. PoC floor control uses either a Talk Burst Control Protocol (TBCP) for PoC version 1.0 or Media Burst Control Protocol (MBCP) for PoC version 2.0. A PoC Server providing a Participating PoC Function provides PoC session handling which includes policy enforcement for incoming PoC sessions and relays Talk Burst Control and Media Burst Control messages between the PoC Client and the PoC Server performing the Controlling PoC Function.

FIG. 1 illustrates in extremely simplified terms the infrastructure that facilitates a PoC session between a pair of wireless terminals identified as UE-A 1 and UE-B 2. UE-A 1 and UE-B 2 include PoC Client A 3 and PoC Client B 4 respectively for supporting the PoC service. The terminals 1,2 are attached to respective radio access networks, RAN-A 5 and RAN-B 6, which in turn are connected to a packet-switched core network 7 including an IP backbone. SIP signalling is routed through the IMS 8, which includes SIP Application Servers acting as PoC Servers. The UEs are registered with respective PoC Servers, namely PoC Server A 9 and PoC Server B 10, although it is possible that both UEs are registered with the same PoC server. A PoC session can provide user voice and data communication between two users (one-to-one), or between a group of users in a group session (one-to-many).

Typically, when a user wants to communicate using a PoC service, the user presses the Push to Talk (PTT) button on their UE and then waits until a confirmation tone (beep) acknowledges that they can start to talk. The time between the user pressing the PTT button and the confirmation is defined in OMA PoC Specifications as KPI1.

Measurements have indicated that when implementing current OMA PoC specifications, KPI1 can be between 2.6 and 3.6 seconds. In some circumstances this time may be acceptable to the user. For example, for a PoC group session the PoC user initiating the session may not expect all members of the group to be instantly available. Furthermore, in some circumstances a PoC user may initiate or join a PoC Group session at the start of the working day and therefore, if the session takes a number of seconds to establish, this may not be a significant delay to such a user. However, when a user wants to communicate with only one other user, the user will expect to be able to establish communication almost instantaneously, i.e. as with a walkie-talkie, without such a delay. Therefore, it is desirable that this time, KPI1, is minimised as far as possible.

KPI1 can be reduced if the invited PoC Client can be configured to Automatic Answer Mode and that the PoC Server serving the invited PoC Client is configured to send an "Unconfirmed Indication" for that PoC Client. Automatic Answer Mode is a PoC Client mode of operation in which the PoC Client accepts a PoC session establishment request without manual intervention from the user; and any media is played immediately upon receipt. If a PoC Server is aware that a PoC Client it is serving is currently in Automatic Answer mode, then that PoC Server can be configured to send an answer on behalf of that PoC Client. This provides an Unconfirmed Indication back towards an inviting PoC Client to transmit media prior to receiving a final response from the invited PoC Client. The PoC Server serving the inviting PoC Client can then send a SIP 200 OK message and a MBCP Media Burst Granted message before the invited PoC Client has accepted the invitation. The inviting PoC Client will then give the user the confirmation tone (beep) acknowledging that they can start to talk. However, this mechanism requires that the PoC Server serving the inviting PoC Client buffer any media sent by the inviting PoC Client until the invited PoC Client has automatically responded by accepting the invitation. Only once the invited PoC Client has accepted the invitation can the media be sent towards the invited PoC Client. Whilst these settings can serve to provide an improved experience to PoC users it is still desirable to further minimise KPI1.

SUMMARY

It is an object of the present invention to reduce the length of time between a user initiating PoC communication and receiving confirmation that they can begin communication, KPI.

According to a first aspect of the present invention there is provided a method of establishing a Push-to-talk over Cellular (PoC) communication session between an inviting PoC client and at least one invited PoC client using an IP Multimedia Subsystem network. The method comprises using the pre-established session procedure to negotiate media parameters between the inviting PoC client and a participating PoC server for the inviting PoC client. At the inviting PoC client, a Talk Burst Control Protocol (TBCP) or Media Burst Control Protocol (MBCP) message is sent directly to its participating PoC server, wherein the TBCP or MBCP message contains the PoC address of the at least one invited PoC client. At said participating PoC Server, in response to receipt of the TBCP or MBCP message, a SIP INVITE message is generated and sent towards a participating PoC server for the at least one invited PoC client.

The step of generating the SIP INVITE message may comprise using the PoC addresses included in the TBCP or MBCP message sent from the inviting PoC client, together with the information received and media parameters negotiated during the pre-established session procedure, to complete the fields and body of the SIP INVITE.

Embodiments of the present invention provide that the TBCP or MBCP message may comprise an IP header, a TBCP or MBCP header, and the PoC address of the at least one PoC client. Preferably, the TBCP or MBCP message may be a TBCP or MBCP Connect message.

According to a second aspect of the present invention there is provided an apparatus configured to operate as a Push-to-talk over Cellular (PoC) client. The apparatus comprises a negotiating unit for negotiating media parameters with a participating PoC server of the PoC client using the pre-established session procedure, and a PoC session initiation unit for generating and sending a Talk Burst Control Protocol (TBCP) or Media Burst Control Protocol (MBCP) message directly to said participating PoC server. The TBCP or MBCP message contains the PoC address of at least one other PoC client.

According to a second aspect of the present invention there is provided an apparatus configured to operate as a Push-to-talk over Cellular (PoC) server. The apparatus comprises a negotiating unit for negotiating media parameters with a PoC Client using the pre-established session procedure, and a PoC session processing unit for receiving a Talk Burst Control Protocol (TBCP) or Media Burst Control Protocol (MBCP) message from said PoC client, the TBCP or MBCP message comprising the PoC addresses of at least one other PoC client, and in response to receipt of TBCP or MBCP message, generating a SIP INVITE message using the negotiated parameters and sending the SIP INVITE message towards a participating PoC server for the at least one other PoC client.

DETAILED DESCRIPTION

In order to communicate using PoC, a PoC Client must establish a PoC session. Currently a PoC session can be established in one of two ways. Firstly, a PoC session can be "Pre-established". A Pre-established Session is a SIP Session established between the PoC Client and the PoC Server that performs the Participating PoC Function. The PoC Client establishes the Pre-established Session prior to making requests for PoC Sessions to other PoC users. The Pre-established session provides a mechanism to negotiate the media parameters (such as IP address, ports, codecs and the accepted Talk Burst Control or Media Burst Control rotocol etc) between the PoC Client and the corresponding participating PoC Server. The Pre-established session can be established immediately after initial registration of the PoC Client with the SIP/IP Core. Using a Pre-established session, the PoC Client is able to activate a media bearer when inviting other PoC Clients to participate in a PoC session or upon receipt of an invite to a PoC session from another PoC Client, without the need to negotiate the media parameters.

Figure 1:
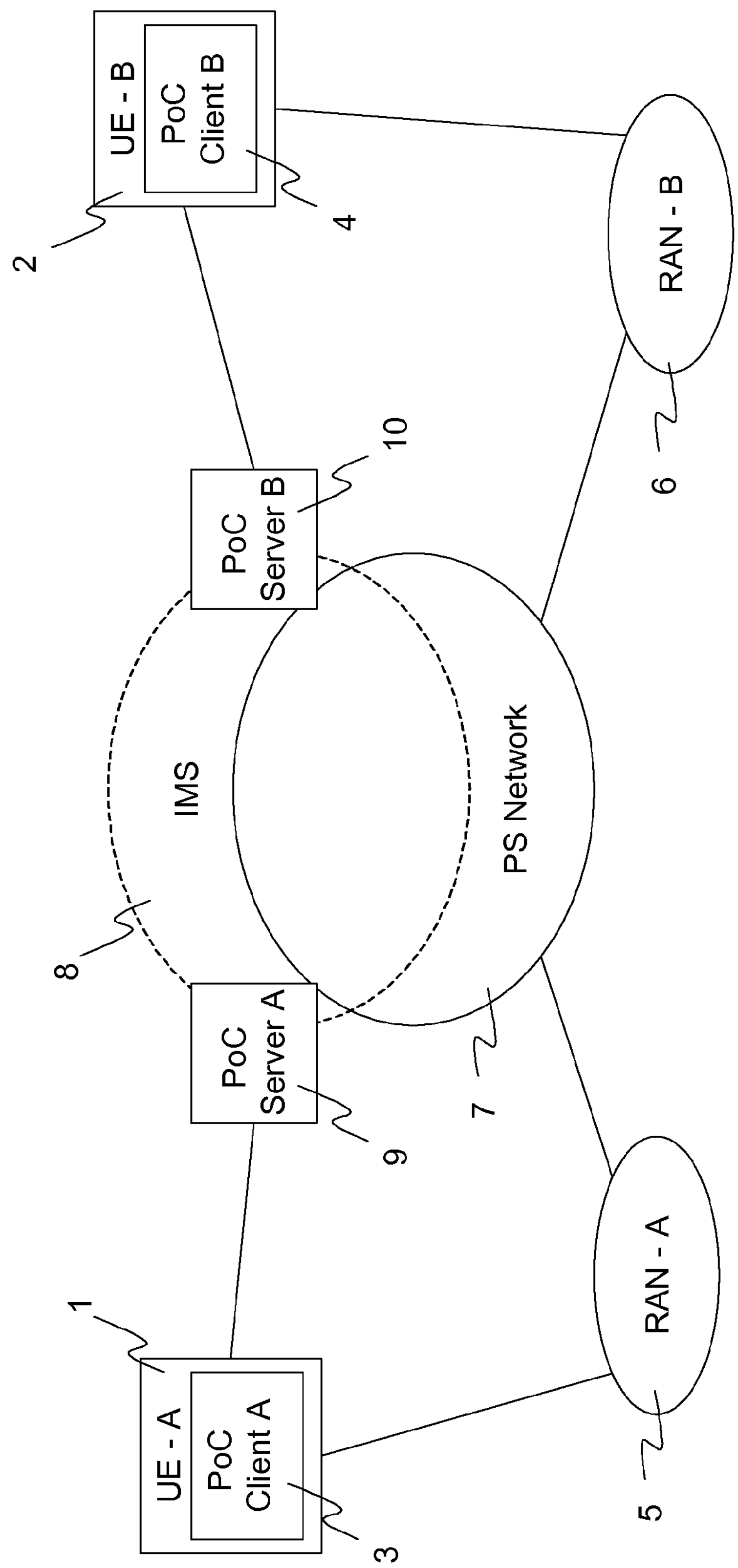
FIG. 1 illustrates schematically the infrastructure that facilitates a PoC session between a pair of wireless terminals.
Figure 2:
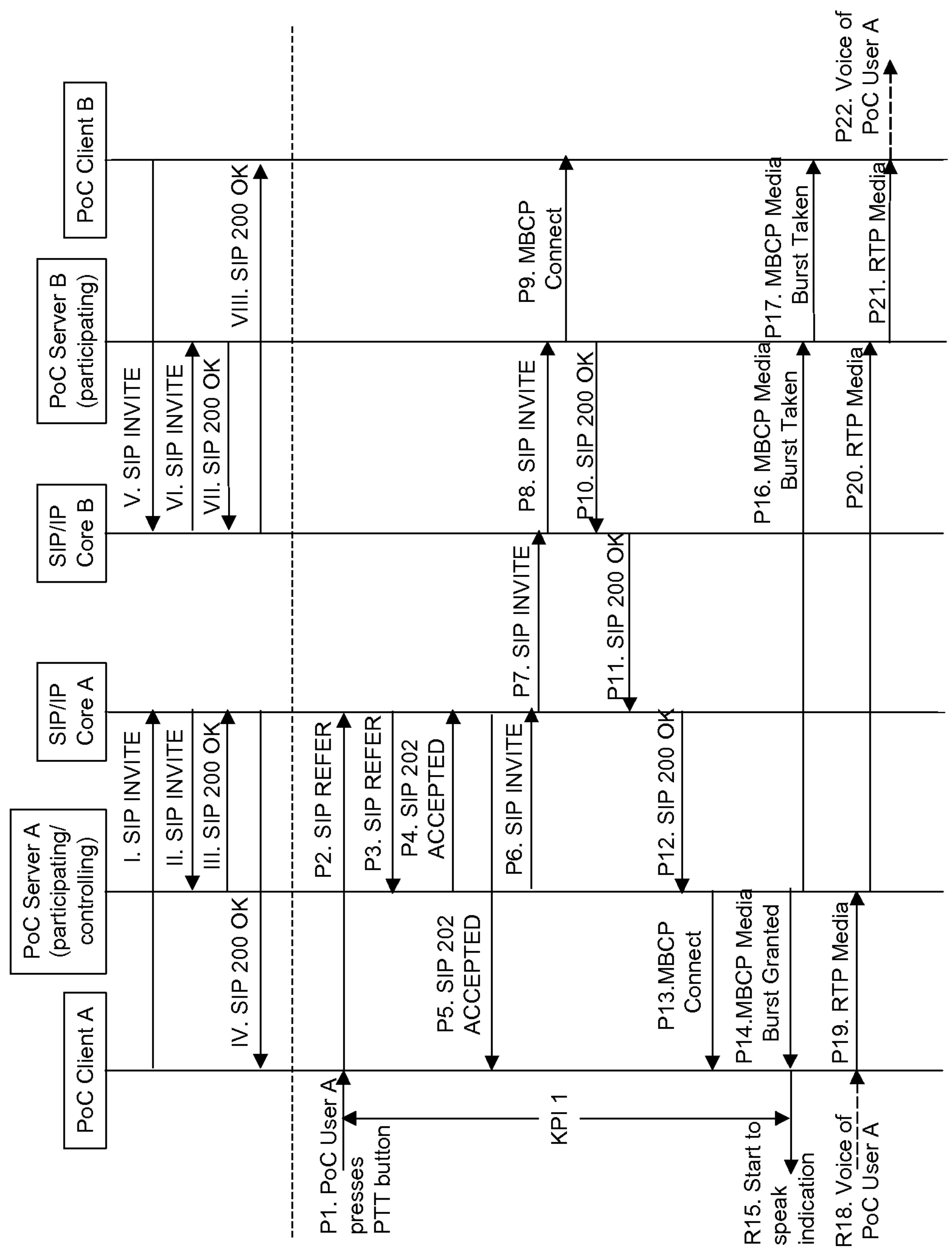
FIG. 2 illustrates an example signalling flow for establishing a 1-to-1 PoC session using a Pre-established PoC session.

FIG. 2 illustrates an example signalling flow for establishing a 1-to-1 PoC session using a Pre-established PoC session, as defined by OMA PoC specifications. In order to establish communication using a Pre-established PoC Session there are two phases. The first phase (steps I to IV and V to VIII) is the set up of a Pre-established PoC Session, e.g. when the mobile is switched on and the PoC Client has registered to the SIP/IP Core. The steps involved are as follows:

I) PoC Client A sends a SIP INVITE request containing all the information (e.g. media parameters etc) necessary for establishing a PoC Session to the SIP/IP Core A. No invited PoC user address is included.

II) SIP/IP Core A forwards the SIP INVITE request to PoC Server A serving PoC User A.

III) PoC Server A authorizes the response and returns a SIP 200 OK request to the SIP/IP Core A. The SIP 200 OK response includes all the information (e.g. media parameters etc) necessary for later use, when communication with another PoC user is required.

IV) SIP/IP Core A forwards the SIP 200 OK response to the PoC Client A.

In the example of FIG. 2, both the inviting PoC Client (A) and the invited PoC Client (B) have Pre-established PoC Sessions and steps V to VIII, identical to steps I to IV, are those steps involved in setting up the Pre-established PoC Session for PoC Client B.

The second phase (steps P1 to P22) is the establishment of a PoC Session when the user wants to communicate with another user. The steps for establishing a one-to-one PoC Session between the two PoC Clients are as follows:

P1) PoC User A at PoC Client A presses the PTT button.

P2) PoC Client A sends a SIP REFER request to the SIP/IP Core A. The SIP REFER request includes the address of the invited PoC user, i.e. in this case the address of the PoC User B at the PoC Client B. The SIP REFER request is an implicit request to send media.

P3) The SIP/IP Core forwards the SIP REFER request to PoC Server A along the signalling path created by the Pre-established Session.

P4) PoC Server A authorizes the request and, if authorized, sends a SIP 202 "Accepted" response to SIP/IP Core A.

P5) SIP IP/Core A forwards the SIP 202 "Accepted" response to PoC Client A along the signalling path.

P6) PoC Server A, using the information in the SIP INVITE request received in step B during the set up of the Pre-established Session, sends a SIP INVITE request to the SIP/IP Core A. The address of PoC User B (received in the SIP REFER request) is included in the SIP INVITE request.

P7) The SIP/IP Core A routes the SIP INVITE request to the SIP/IP Core B based on the address of PoC User B.

P8) The SIP/IP Core B routes the SIP INVITE request to PoC Server B, serving PoC Client B.

P9) PoC Server B performs access control (i.e. checks if PoC User B allows invites from PoC User A etc). In this example PoC User A is authorized and PoC User B has provided that automatic answer mode shall be used. In addition, PoC Server B compares the media parameters received in the SIP INVITE request from PoC Server A, with the media parameters received in the SIP INVITE request received from PoC Client B during setup of the Pre-established Session. In this example the media parameters are compatible. PoC Server B sends a MBCP Connect message to the PoC Client B. The MBCP Connect message contains the address of PoC User A.

P10) PoC Server B sends a 200 "OK" response to the SIP/IP Core B. The SIP 200 "OK" response includes the media parameters to be used in the PoC Session.

P11) SIP/IP Core B forwards the SIP 200 "OK" response to the SIP/IP Core A along the signalling path.

P12) SIP IP/Core A forwards the SIP 200 "OK" response to PoC Server A.

P13) PoC Server A sends a MBCP Connect message to PoC Client A.

P14) PoC Server A then sends a MBCP Media Burst Granted message in order to grant the permission to PoC Client A to send media. This permission is implicitly requested by the SIP REFER request.

P15) When PoC Client A has received the MBCP Media Burst Granted message, PoC Client A gives PoC User A some start to speak indication (e.g. a beep).

P16) PoC Server A sends a MBCP Media Burst Taken message to PoC Server B. This message contains the identity of the participant sending media, in this example, PoC User A.

P17) PoC Server B forwards the MBCP Media Burst Taken message to PoC Client B.

P18) PoC User A begins to speak.

P19) PoC Client A converts the voice according to the codec negotiated using the SIP INVITE request and SIP 200 "OK" response sent during set up of the Pre-established Session. PoC Client A sends RTP Media packets to the PoC Server A.

P20) PoC Server A forwards the RTP Media packets to PoC Server B.

P21) PoC Server B forwards the RTP Media packets to the PoC Client B.

P22) PoC Client B converts the RTP Media packets and plays the voice of the PoC User A to the PoC User B Alternatively, a PoC session can be established "On-Demand". This means that the PoC session is established and media parameters are negotiated when inviting other PoC Clients to participate in a PoC session or upon receipt of an invite to a PoC session from another PoC Client.

Figure 3:
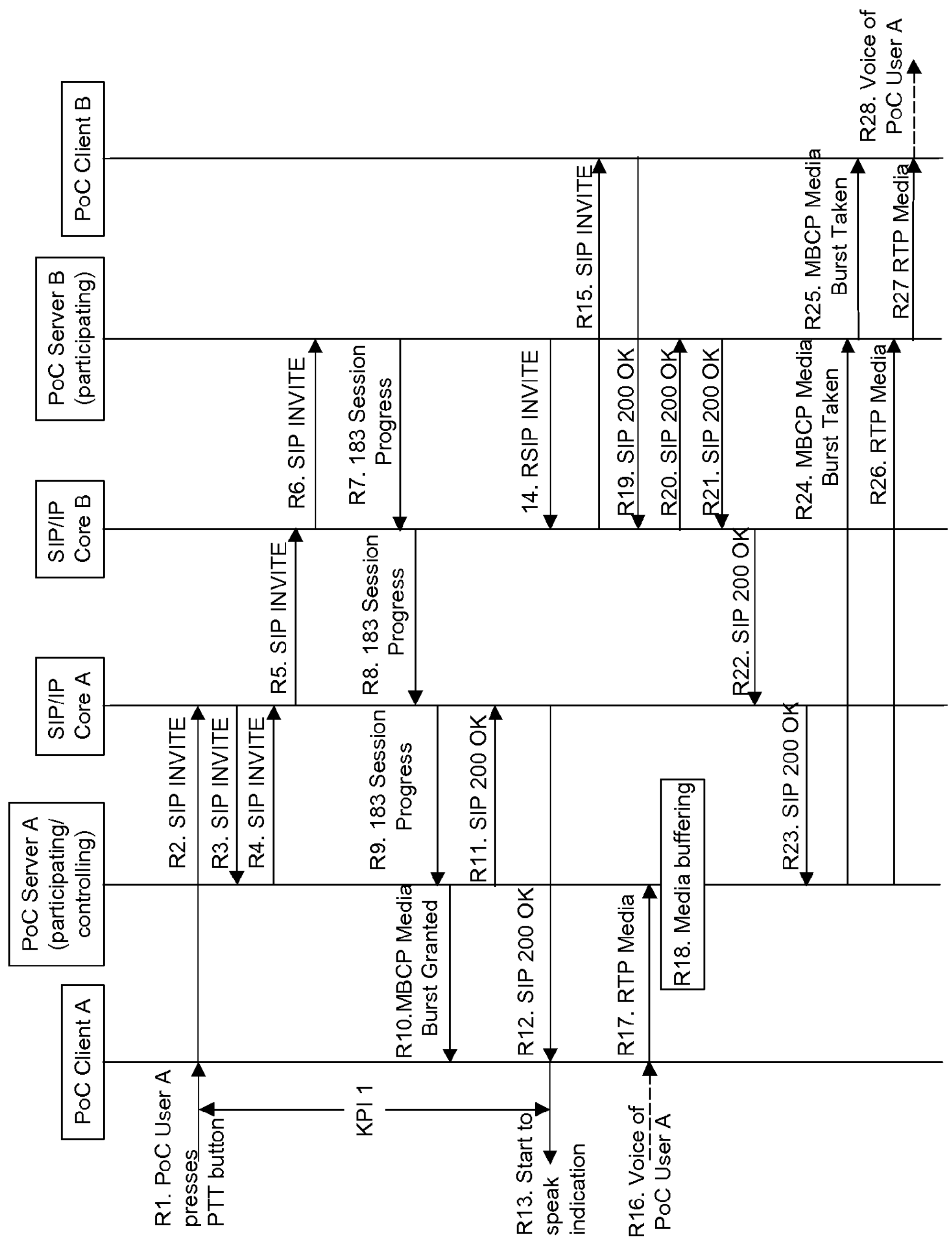
FIG. 3 illustrates an example signalling flow for establishing a 1-to-1 PoC session using an On-Demand PoC session.

FIG. 3 illustrates an example signalling flow for establishing a one-to-one PoC session using On-Demand signalling, as defined by OMA PoC specifications. The steps performed are as follows:

R1) PoC User A at PoC Client A presses the PTT Button.

R2) PoC Client A sends a SIP INVITE request to SIP/IP Core A. The SIP INVITE request contains all necessary information for establishing a PoC Session (e.g. media parameters, the address of the PoC User B at PoC Client B, etc.). The SIP INVITE request is at the same also time an implicit request for permission to send media.

R3) SIP/IP Core A forwards the SIP INVITE request to PoC Server A.

R4) PoC Server A authorizes the SIP INVITE request and sends it to the SIP/IP Core A.

R5) SIP/IP Core A routes the SIP INVITE request to the SIP/IP Core B.

R6) SIP/IP Core B forwards the SIP/INVITE request to PoC Server B.

R7) PoC Server B performs access control (i.e checks if PoC User B allows invites from PoC User A). In this example PoC User A is authorized and PoC User B has provided that automatic answer mode shall be used. The PoC Server B sends a SIP 183 "Session Progress" response towards the PoC Server A. The SIP 183 "Session Progress" response includes an "Unconfirmed Indication" informing PoC Server A that the PoC User B has not accepted the invitation yet and that media needs to be buffered until the PoC Client B accepts the invitation.

R8) SIP/IP Core B forwards the response to SIP/IP Core A along the signalling path.

R9) SIP/IP Core A forwards the response towards PoC Server A along the signalling path.

R10) PoC Server A sends an MBCP Media Burst Granted message in order to grant permission to PoC Client A to send Media.

R11) PoC Server A sends a SIP 200 "OK" message to the SIP/IP Core A. The SIP 200 "OK" response contains information about the PoC Session e.g. the media parameters to be used.

R12) SIP/IP Core A forwards the SIP 200 "OK" response to PoC Client A along the signalling path.

R13) When PoC Client A has received both the MBCP Media Burst Granted message and the SIP 200 "OK" response, PoC Client A gives PoC User A the start to speak indication (e.g. a beep).

R14) Meanwhile, PoC Server B sends a SIP INVITE request to the SIP/IP Core B.

R15) SIP/IP Core B routes the SIP INVITE request to PoC Client B according to information received when PoC User B registered to the SIP/IP Core.

R16) PoC User A begins to speak.

R17) PoC Client A converts the voice according to the codec negotiated using the SIP INVITE request and SIP 200 "OK" response. PoC Client A sends RTP Media packets to the PoC Server A.

R18) PoC Server A has not yet received an acceptance from the PoC Client B, therefore PoC Server A buffers the received RTP Media packets.

R19) PoC Client B receives the SIP INVITE request and automatically accepts the invitation to the 1-1 PoC Session by sending a SIP 200 "OK" response to the SIP/IP Core B. The SIP 200 "OK" response contains information about the PoC Session e.g. the media parameters to be used.

R20) SIP IP/Core B forwards the response to PoC Server B along the signalling path.

R21) PoC Server B forwards the SIP 200 "OK" response to SIP/IP Core B along the signalling path.

R22) SIP/IP Core B forwards the SIP 200 "OK" response to SIP/IP Core A along the signalling path.

R23) SIP/IP Core A forwards the SIP 200 "OK" response to PoC Server A along the signalling path.

R24) PoC Server A sends a MBCP Media Burst Taken message to PoC Server B. The message includes the address of PoC User A.

R25) PoC Server B forwards the MBCP Media Burst Taken message to PoC Client B.

R26) PoC Server A sends the RTP Media packets in the buffer to the PoC Server B.

R27) PoC Server B forwards the RTP Media packets to PoC Client B.

R28) PoC Client B converts the RTP Media packets and plays the voice of PoC User A to PoC User B.

As has already been discussed, it is desirable that KPI1, the time between a user initiating PoC communication, i.e. pressing the PTT button on the UE, and receiving confirmation that they can begin communication, is minimised as far as possible.

It is recognised here that the value of KPI1 is largely dependent upon the time it takes to transfer the SIP INVITE message (for On-demand session signalling) or the SIP REFER message (for Pre-established session signalling), from the inviting PoC Client to its serving PoC Server. This initiating message is sent over the air interface from the user terminal containing the PoC Client using the radio access network to reach a PoC Server in the packet switched core network. In such wireless networks limited bandwidth is a problem such that the transmission of large messages can introduce significant delays.

The SIP Request messages used to initiate a PoC communication, such as SIP INVITE and SIP REFER, are comparatively large messages comprising a number of header fields and their field values, as well as the message body. A typical SIP INVITE or SIP REFER can comprise around 1700 characters. As such, these large SIP requests can take a relatively long time to transport over a network such as a GPRS network. Although 3G networks can provide a higher rate of data transfer than for example a GRPS network, large messages cause a state change in the channel that delays the transmission of messages. Further, large messages force the use of TCP connections that take extra time to establish, causing an additional delay that extends KPI1.

The OMA PoC specifications do state that it is possible to compress the SIP signalling, i.e. using SigComp as specified in RFC3320, RFC3485 and RFC3486. However, the capability required to compress SIP is not widely used and, even when SIP compression is used, the compression ratio can be destroyed by certain SIP requests such as SIP NOTIFY. The reason for this is that in implementing SigComp the PoC Client and the SIP/IP Core build up a dictionary containing those expressions most used in SIP requests and SIP responses. However, this dictionary is limited in size and a SIP NOTIFY request may over-write the content of the dictionary with text unrelated to the establishment of SIP dialogs. Other compression standards could also reduce KPI1, i.e. IP header compression. However, these other compression methods are also not widely available or used. Furthermore, any compression and de-compression of the SIP messages also takes time that will impact on any savings made in transmitting the messages.

There will now be described a method of reducing the length of time between a user initiating PoC communication and receiving confirmation that they can begin communication. The method is effective in reducing KPI1 when making use of a Pre-established PoC session and involves reducing the size of the message that initiates the PoC communication session. In particular the method involves expanding the existing Talk Burst Control or Media Burst Control Protocol to introduce a new message, TBCP/MBCP Setup, to replace the SIP INVITE or SIP REFER message sent by the PoC Client to the PoC Server, in order to initiate a PoC communication session. The TBCP/MBCP Setup message includes only that information absolutely necessary to establish communication with another user (i.e. the address of the invited PoC user). For example, if a PoC User wants to talk to another user with the PoC address tel: +4687197378 then the MBCP Setup message may comprise 28 bytes of IP headers, 16 bytes of RTCP/TBCP headers, and 17 bytes for the CNAME item including 2 bytes for the identifier of the CNAME and a length indicator and 15 bytes for the tel URI, giving a total of only 61 bytes for the message. As a result the TBCP/MBCP Setup message is significantly smaller than the SIP INVITE or SIP REFER message used to initiate communication according to current PoC specifications. The use of a smaller message reduces the time taken to transmit the message and therefore reduces KPI1. Any further detailed information regarding the PoC Client and the session settings will be available to the PoC Server having been determined during set up of the Pre-established session, i.e. received in the SIP INVITE message sent when the dialog for the Pre-established session was established.

Figure 4:
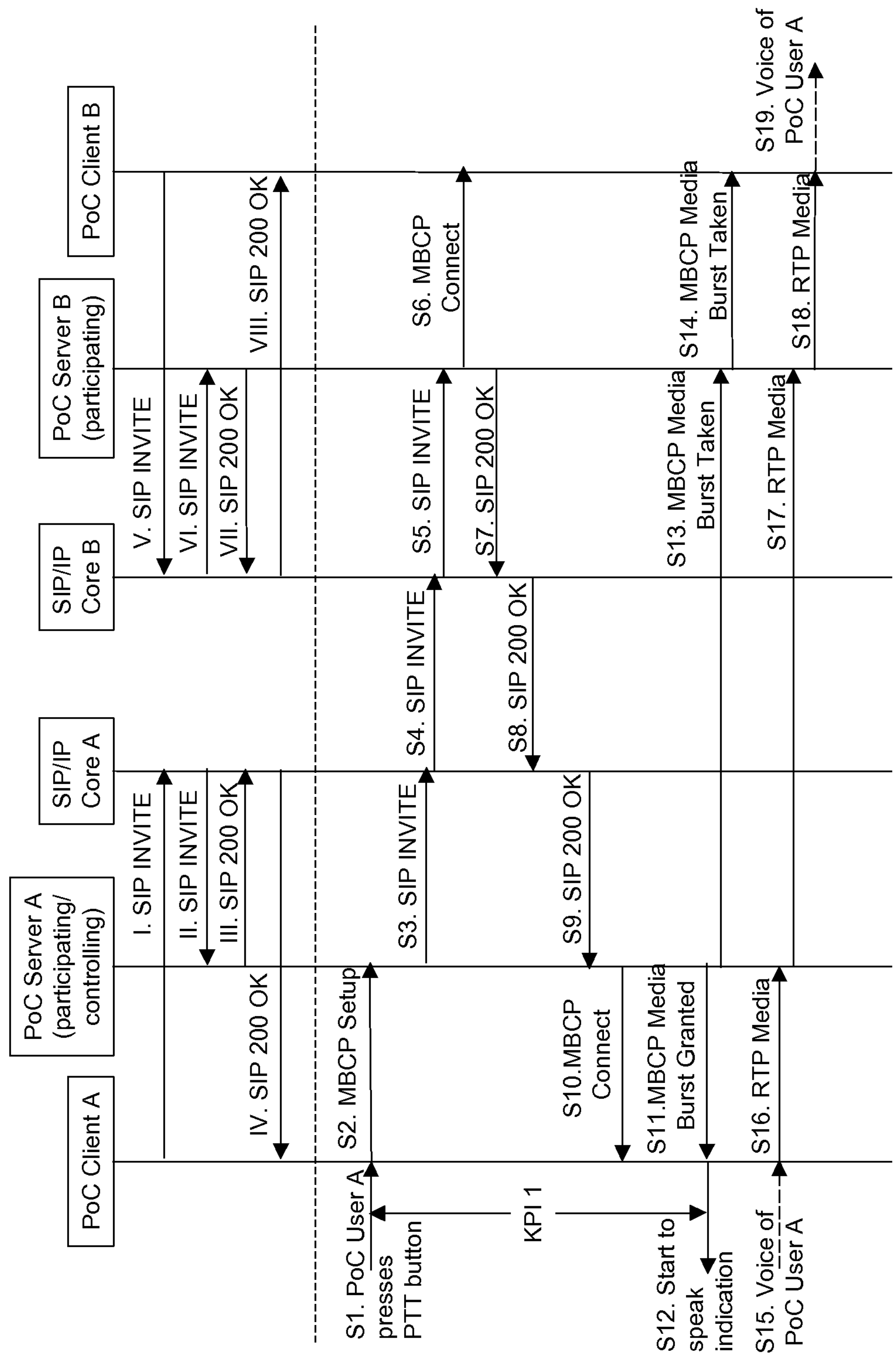
FIG. 4 illustrates an example signalling flow for establishing a 1-to-1 PoC session using a Pre-established PoC session according to an embodiment of the present invention.

FIG. 4 illustrates an example signalling flow for establishing a one-to-one PoC session using Pre-established session signalling according to an embodiment of the present invention. As previously described in relation to FIG. 2, there are two phases required to establish communication using a Pre-established PoC Session. The first phase (steps I to IV and V to VIII) is the establishment of a Pre-established PoC Session. In this example these steps are the same as those performed in the example of FIG. 2.

Following the set up of the Pre-established Session, the second phase is the establishment of a PoC Session when the user wants to communicate with another user. The steps for establishment of a one-to-one PoC Session within the Pre-established Session according to an embodiment of the present invention are as follows:

S1) PoC User A at the PoC Client A presses the PTT button.

S2) PoC Client A sends an MBCP Setup message to PoC Server A. The MBCP Setup message includes the address of the Invited PoC User, i.e. in this case the address of the PoC User B at the PoC Client B. The MBCP Setup message is an implicit request to send Media.

S3) PoC Server A authorizes the request and, if authorized, uses the information received in the SIP INVITE request when the Pre-established Session was established in step B, to send a SIP INVITE request to SIP/IP Core A. The address of PoC User B (received in the MBCP Setup message) is included in the SIP INVITE request.

S4) SIP/IP Core A routes the SIP INVITE request to SIP/IP Core B based on the address of the PoC User B.

S5) SIP/IP Core B routes the SIP INVITE request to PoC Server B, serving the PoC User B.

S6) PoC Server B performs access control (i.e. checks if PoC User B allows invites from PoC User A). In this example PoC User A is authorized and PoC User B has provided that automatic answer mode shall be used. In addition, PoC Server B compares the Media parameters received in the SIP INVITE request from PoC Server A, with the Media parameters received in the SIP INVITE request received from PoC Client B during setup of the Pre-established Session. In this example the Media parameters are compatible. PoC Server B sends a MBCP Connect message to the PoC Client B. The MBCP Connect message contains the address of PoC User A.

S7) PoC Server B sends a 200 "OK" response to SIP/IP Core B. The SIP 200 "OK" response includes Media parameters to be used in the PoC Session.

S8) SIP/IP Core B forwards the SIP 200 "OK" response to SIP/IP Core A along the signalling path.

S9) SIP IP/Core A forwards the SIP 200 "OK" response to PoC Server A.

S10) PoC Server A sends a MBCP Connect to the PoC Client A.

S11) PoC Server A then sends a MBCP Media Burst Granted message in order to grant the permission to PoC Client A to send Media. This permission is implicitly requested by the MBCP Setup request.

S12) When PoC Client A has received the MBCP Media Burst Granted message, PoC Client A gives PoC User A the start to speak indication (e.g. a beep).

S13) PoC Server A sends a MBCP Media Burst Taken message to PoC Server B. This message contains the identity of the participant sending Media, in this example, PoC User A.

S14) PoC Server B forwards the MBCP Media Burst Taken message to PoC Client B.

S15) PoC User A begins to speak.

S16) PoC Client A converts the voice according to the codec negotiated using the SIP INVITE request and SIP 200 "OK" response sent during set up of the Pre-established Session. PoC Client A sends RTP Media packets to the PoC Server A.

S17) PoC Server A forwards the RTP Media packets to PoC Server B.

S18) PoC Server B forwards the RTP Media packets to the PoC Client B.

S19) PoC Client B converts the RTP Media packets and plays the voice of the PoC User A to the PoC User B The signalling flow of FIG. 4 shows how the SIP REFER request, sent from the inviting PoC Client A to SIP/IP Core A and forwarded by SIP/IP Core A to PoC Server A, is replaced by a MBCP Setup message, sent directly from PoC Client A to PoC Server A. The MBCP Setup message contains only the minimum information necessary to establish the session, i.e. the contact information of the invited user(s). As a result, the MBCP Setup message is significantly smaller then the SIP REFER message that it replaces. Following receipt of the MBCP Setup message, PoC Server A then uses the information determined during set up of the Pre-established session to insert any additional information that is required into the SIP INVITE to be sent to PoC Server B. Furthermore, the MBCP Setup message is sent directly to PoC Server A, removing the need for an exchange of messages between PoC Server A and SIP/IP Core A, as described in steps P2 to P5 relating to FIG. 2. This reduction in the number of messages sent, in combination with the reduced size of the initiating message, provides a significant reduction in KPI1.

Although the embodiment described above relates to establishing a one-to-one PoC session, a reduced size message, such as the proposed MBCP Setup message, could also be implemented for establishing communication with a PoC Group. However, as the number of users in the group increases, the number of addresses (i.e. SIP URI) that must be included in the message leads to an increase in the size of the message. Increasing the size of the message in turn increases the transmission time and therefore reduces the effectiveness of the method for groups of significant size. Furthermore, the embodiment described above makes use of a Pre-established session at both the inviting and invited PoC Clients, however, the method would also be applicable if the invited PoC Client did not have a Pre-established session, and therefore needed to establish the session On-Demand. The reduced size of the initiating message and the reduced signalling would still serve to reduce KPI1 although with less significance.

Figure 5:
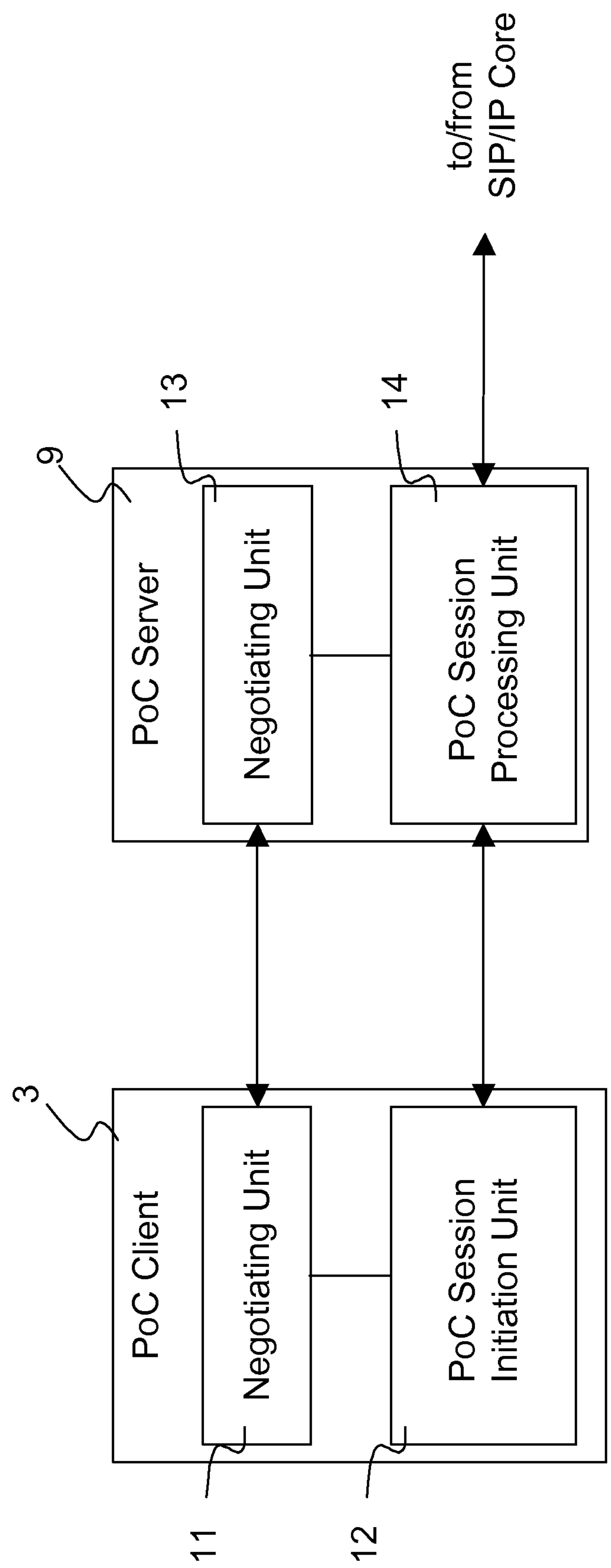
FIG. 5 illustrates schematically a PoC Client and a PoC Server suitable for establishing a PoC session according to an embodiment of the present invention.

FIG. 5 illustrates schematically an inviting PoC Client 3 and its participating PoC Server 9 suitable for implementing the method described above. The inviting PoC Client 3 and the PoC Server 9 are implemented as a combination of computer hardware and software. The PoC Client 3 comprises a negotiating unit for negotiating media parameters with the participating PoC server 9 using the pre-established session procedure and a PoC session initiation unit 12 for generating and sending a TBCP or MBCP Setup message to the participating PoC server 9. The TBCP or MBCP message contains the PoC addresses of the invited PoC clients. The PoC Server 9 comprises a negotiating unit 13 for negotiating media parameters with the PoC Client 3 using the pre-established session procedure and a PoC session processing unit 14 for receiving the TBCP or MBCP Setup message from the PoC Client 3. In response to the receipt of the TBCP or MBCP Setup message PoC session processing unit 14 then generates a SIP INVITE message and sends this SIP INVITE message towards the participating PoC servers for of the invited PoC Clients (not shown).

It will be appreciated by the person of skill in the art that various modifications may be made to the above-described embodiments without departing from the scope of the present invention. For example, although FIGS. 2, 3 and 4 and the embodiments described above make use of Media Burst Control Protocol messages, as defined for PoC 2.0, the Talk Burst Control Protocol, as defined for PoC 1.0 could equally be used. Furthermore, the embodiment described above makes use of a new MBCP Setup message, proposed as an extension to MBCP. However, the method could make use of any reduced size message in order to reduce KPI1. A further example would be to make use of the existing MBCP Connect message, implemented by changing the procedures in MBCP.

The invention claimed is:

1. A method of establishing a Push-to-talk over Cellular (PoC) communication session between an inviting PoC client and at least one invited PoC client using an IP Multimedia Subsystem network, the method comprising:

using a pre-established session procedure to negotiate media parameters between the inviting PoC client and a participating PoC server for the inviting PoC client;

at the inviting PoC client and not in response to any received messages from any of the at least one invited PoC client, sending a Talk Burst Control Protocol (TBCP) or Media Burst Control Protocol (MBCP) message directly to the participating PoC server for the inviting PoC client in order to initiate the PoC communication session, the TBCP or MBCP message containing a PoC address of the at least one invited PoC client, and the TBCP or MBCP message not being part of any Session Initiation Protocol (SIP) INVITE message; and at the participating PoC Server, in response to receipt of the TBCP or MBCP message, generating a SIP INVITE message and sending the SIP INVITE message towards a participating PoC server for the at least one invited PoC client, wherein generating the SIP INVITE message comprises:

using the PoC addresses included in the TBCP or MBCP message sent from the inviting PoC client together with information received and media parameters negotiated during the pre-established session procedure to complete the fields and body of the SIP INVITE message.

2. The method according to claim 1, wherein the TBCP or MBCP message is a TBCP or MBCP Connect message.

3. The method according to claim 1, wherein the TBCP or MBCP message comprises:

an IP header;

a TBCP or MBCP header; and the PoC address of the at least one invited PoC client.

4. An apparatus configured to operate as a Push-to-talk over Cellular (PoC) client, the apparatus comprising:

a negotiating unit for negotiating media parameters with a participating PoC server of the PoC client using a pre-established session procedure; and a PoC session initiation unit for generating and sending a Talk Burst Control Protocol (TBCP) or Media Burst Control Protocol (MBCP) message directly to the participating PoC server of the PoC client in order to initiate a PoC communication session, the TBCP or MBCP message containing a PoC address of at least one other PoC client, and the TBCP or MBCP message not being part of any Session Initiation Protocol (SIP) INVITE message, wherein the PoC session initiation unit's generating and sending the TBCP or MBCP message is not in response to any received messages from any of the at least one invited PoC client, wherein the TBCP or MBCP message comprises:

an IP header;

a TBCP or MBCP header; and the PoC address of the at least one invited PoC client.

5. An apparatus configured to operate as a Push-to-talk over Cellular (PoC) server, the apparatus comprising:

a negotiating unit for negotiating media parameters with a PoC Client using a pre-established session procedure; and a PoC session processing unit for receiving a Talk Burst Control Protocol (TBCP) or Media Burst Control Protocol (MBCP) message from the PoC client initiating a PoC communication session, the TBCP or MBCP message comprising PoC addresses of at least one other PoC client, and the TBCP or MBCP message not being part of any Session Initiation Protocol (SIP) INVITE message, and, in response, generating a SIP INVITE message using the negotiated media parameters and sending the SIP INVITE message towards a participating PoC server for the at least one other PoC client, wherein the received TBCP or MBCP message is not a message that is in response to any received messages from any of the at least one invited PoC client, wherein generating the SIP INVITE message comprises:

using the PoC addresses included in the TBCP or MBCP message sent from the inviting PoC client together with information received and media parameters negotiated during the pre-established session procedure to complete the fields and body of the SIP INVITE message.

* * * * *